June 4, 1940.  E. REANEY  2,203,104
TOOL HOLDER AND CLAMP
Filed Nov. 23, 1938
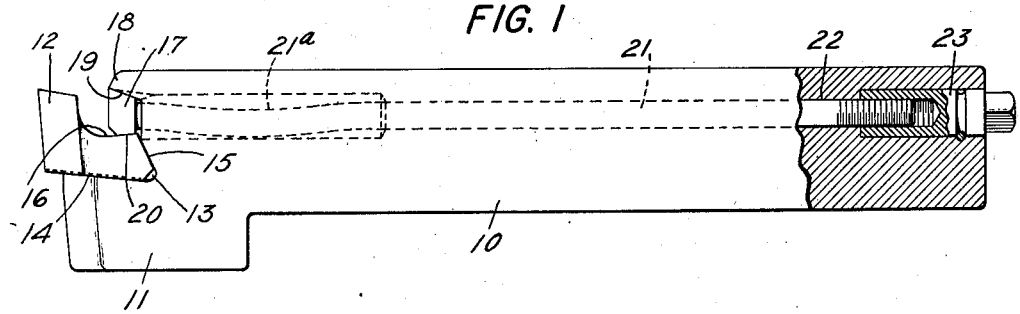
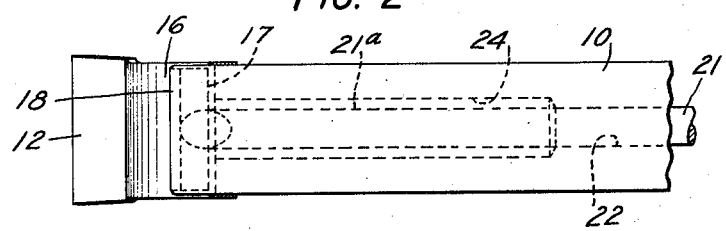
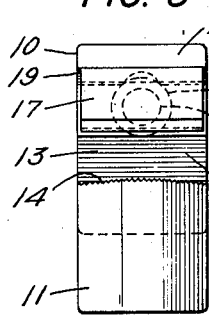 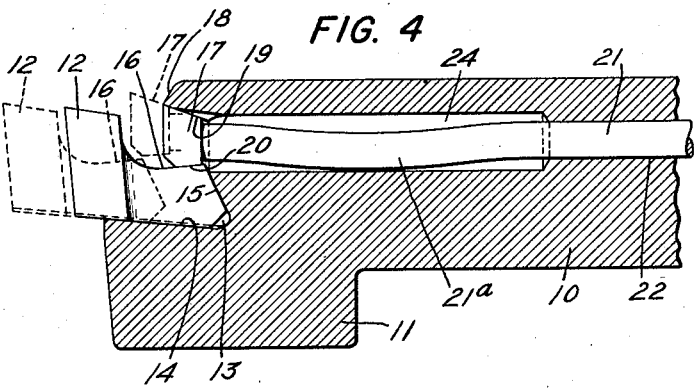
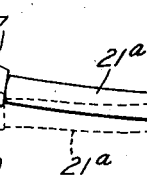
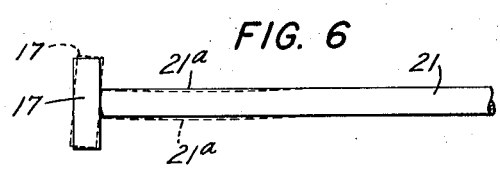
INVENTOR
Ernest Reaney
BY
Albert F. Nathan
ATTORNEY Patented June 4, 1940

2,203,104

UNITED STATES PATENT OFFICE 2,203,104

TOOL HOLDER AND CLAMP

Ernest Reaney, Stratford, Conn., assignor to The O. K. Tool Company, Inc., New York, N. Y., a corporation of New York Application November 23, 1938, Serial No. 241,967

6 Claims. (Cl. 29—96)

This invention concerns improvements in insertable bit tools and holders and more particularly to improvements in the bit clamping mechanisms thereof. In my prior application Serial No. 195,472, filed March 12, 1938, there is disclosed a tool bit holder and bit clamping arrangement which satisfactorily meets the majority of demands placed upon it but which is lacking in certain improved features and relationships of elements of the clamping mechanism which characterize and distinguish the present invention.

In my said prior application the bit was clamped in the holder by means of a wedge piece inserted between the bit and overlying portion of the holder body and which was drawn inwardly and downwardly by means of a short stud. The stud was rotatably secured to the wedge piece and as the clamping pressures increased, became more difficult to turn by reason of the increasing friction between the stud and the wedge piece. Slight irregularities in the tool bit had a tendency to strain the wedge piece out of its true or theoretically true path of movement and apart from resulting in non-uniformity in clamping pressure over the bit, this further increased the binding effects and made the clamping difficult.

A primary aim of the present invention is to render available a structure in which the clamping wedge may have a somewhat universal movement which will effectively compensate for minor irregularities in shapes and sizes of tool bits to the end that a firm clamping action will be obtained without unduly straining any of the parts.

A further objective of the invention is to provide a tool holder structure in which the bit clamping mechanism is self-releasing in character so that bit inserting or removing operations may be accomplished with ease and facility, and at the same time to provide a structure in which there is but one moving part.

Still a further objective of the invention is to obtain in a compensating clamp arrangement, firm and solid clamp effects over substantially the entire width of the inserted bit and to effect such increased clamping action without introducing clamping screws or other auxiliary devices at the nose end of the tool which would serve merely to increase its bulkiness at regions where sizes and proportions should be reduced to their minimum values consistent with the strength required in the assembled tool.

A further aim of the invention is to provide a rugged tool holder and bit clamping means devoid of complexities in the way of shapes and configurations of the parts, and a clamping means that renders itself adaptable to comparatively few and simple machining operations, and which, when assembled, will afford the requisite firm clamping action in a compensating way, with the utilization of the fewest number of parts.

In carrying out the aims of this invention it is proposed to form a substantially open bit-receiving slot in the forward end of the holder. The bottom surface of the slot is generally horizontally disposed but inclines downwardly and terminates in a relatively inclined rear abutment wall. A portion of the body member overlies a part of the said bottom surface but is spaced therefrom a distance sufficient to accommodate therebetween an inserted tool bit and a superposed wedge piece. The upper and lower surfaces of the wedge piece are generally horizontal but converge toward the rear so that as the wedge piece is moved rearwardly, it moves simultaneously downwardly and urges the tool bit against the bottom and rear surfaces of the slot in the holder.

Since it is difficult, if not impossible, to construct each inserted tool bit and the tool bit receiving aperture itself with that high degree of precision required to effect the ultima of uniformity when dealing with interchangeable parts, the invention undertakes to provide a structure whereby the clamping element itself may have a limited amount of free movement so that it may automatically adjust itself to such irregularities to the end that a rigid clamping of any particular bit inserted in the holder may be attained. This result has been achieved herein by forming the clamping element as a "head" upon a relatively long draw bolt which extends through the body of the holder. The forward portion of the draw bolt is given a definite deflection in a direction such that it tends normally to lift the head off of the inserted bit as the clamp is moved in a releasing direction, and the forward portion of the draw bolt bore in the body member is counterbored somewhat larger to afford ample space for the flexing action.

When the parts are assembled, the head end of the draw bolt normally presses itself against the overhanging portion of the body member and thus keeps the bit receiving opening proper, clear of obstructions and loose pieces so that the tool bit may be inserted and adjusted with ease. Additionally, the somewhat floating character of the clamping wedge enables the same to move angularly in finding its own seat with respect to the surfaces of the bit and holder, thus insuring equalization of the clamping pressure and distributing the pressure over substantially the entire top surface of the bit. During actual tooling operations when the bit is subjected to various tooling forces acting in a multitude of directions, the uniform clamping of the bit, in accordance with this invention, effectively holds the bit solidly in position against the walls of the holder proper. The tooling forces are thereby transmitted directly to the holder through surfaces of ample area. Tendencies toward vibration or chattering, incident to localizing the clamping force to only the "high spots," have been effectively eliminated.

Other objects and advantages will be in part indicated in the following description and in part rendered apparent therefrom in connection with the annexed drawing.

To enable others skilled in the art so fully to apprehend the underlying features hereof that they may embody the same in the various ways contemplated by this invention, drawing depicting a preferred typical construction have been annexed as a part of this disclosure and, in such drawing, like characters of reference denote corresponding parts throughout all the views, of which:

Figure 1 is a side elevation, partly in section, of a tool holder embodying the principle of the present invention.

Fig. 2 is a plan view of the forward portions of the holder.

Fig. 3 is a front view of the holder with the bit removed.

Fig. 4 is a longitudinal sectional view of the forward portions of the holder.

Figs. 5 and 6 are detail views of the draw bolt illustrating in a somewhat exaggerated way the equalizing features of the clamp.

Referring more particular to Fig. 1 of the drawing, the invention is disclosed in connection with the lathe type of tool holder which consists of an elongated body 10 having an integral depending head portion 11 at its forward end. The head portion 11 depends below the main shank to provide a rear abutment surface and to provide the requisite strength in the supporting platform for the tool bit 12. A bit receiving slot 13 is formed across the forward end of the holder and is defined by a lower wall 14 that slopes downwardly to the rear and terminates in an upstanding abutment wall 15. The shank portion of the bit 12 is provided with complementally inclined surfaces as illustrated in Fig. 1. The upper surface 16 of the shank of the bit, slopes downwardly in a forward direction and forms together with the bottom surface of the bit, a structure that is dovetailed in vertical longitudinal section.

Above the bit and normally resting upon the surface 16 is a wedge member 17 which is interposed between the bit and an overlying portion 18 of the holder. The under surface 19 of the overhanging portion of the holder slopes downwardly toward the rear at an angle appreciably steeper than the angle of the sloping seating surface 14 so that the two surfaces 19 and 14 mutually converge in a rearward direction.

The under surface 20 of the wedge piece 17 slopes downward in a forward direction complemental to the upper surface 16 of the bit and in effect forms a positive abutment for pulling the bit rearwardly and downwardly as the wedge piece is moved rearwardly and downwardly. The surfaces 14, 16, 19 and 20 are substantially flat surfaces which extend crosswise the holder in substantially parallel horizontal planes as illustrated, in part, in Fig. 3.

In order to provide the necessary strength in the bit clamp, firstly, to secure rigid clamping in a downward and rearward direction and, secondly, to prevent overturning of the bit by the application of a sudden extreme force, the wedge piece 17 is positioned as illustrated between the shank of the bit and an integral or solid part of the tool holder body. The wedge 17 therefore is subjected only to compressive forces which indeed may be very great without producing any harmful effects.

As herein before stated, the invention contemplates an arrangement whereby the wedge 17 may have a limited floating movement to compensate for any minor irregularities on the sloping surface 16 of the bit, and to that end the clamping block 17 is made preferably integral with a relatively long draw bolt 21. The attenuated draw bolt extends through a bore 22 provided in the shank 10 and is shifted axially by means of a rotatable but non-translatable nut 23 threaded to its end. The forward portions of the bore is enlarged, as indicated at 24, so as to allow ample space for a limited movement of the wedge block and forward portion 21ª of the bolt in transverse directions.

The head end 21ª of the draw bolt itself, as illustrated in the full line position shown in Fig. 5, is given an initial inflection upwardly so that when the parts are assembled the wedge-like head 17 is caused to press against the upper surface 19 of the body as it is propelled inwardly or outwardly by the clamp nut 23. The dotted line position illustrated in Fig. 4, illustrates the relation just referred to, whereby it becomes possible to insert or readjust the tool bit without interference with the clamp piece.

In addition to this self releasing function of the clamp element, the clamp element itself may have, because of the enlarged bore 24 which extends approximately ⅓ the length of the draw bolt, a certain freedom of angular or twisting movement relative to the tool bit and to the main shank 10 of the holder thereby automatically to compensate for any irregularities in or on the various clamping surfaces while at the same time affording an automatically operating means for equalizing the clamping pressures over the entire surface 16 of the tool bit. Thus, as the wedge block is moved rearwardly, by the action of the clamp nut 23, it may be caused to dip or swing slightly to one side or the other as it finds its proper seat, and simultaneously by reason of the relation of the sloping surfaces on the clamp, tool bit, and holder, urges the bit rearwardly and downwardly in clamped position.

By this arrangement it will be seen, that the wedge piece, when in clamped position, is subjected only to compressive forces and those forces are automatically equalized and distributed uniformly across the width of the bit and holder. No shearing action of the wedge block 17 relative to the shank 21ª of the draw bolt takes place, firstly, because of the equalizing and uniform clamping action and, secondly, because of the enlargement of the bore at 24 which affords freedom of lateral movement of the clamp and of the forward portions 21ª of the draw bolt incident to the self-seating and compensating action of the clamp element.

As illustrated in the drawing, the draw bolt of the present invention may be made considerably larger in section than has heretofore been possible, and by providing space for a limited amount of bolt deflection while maintaining the other portions and particularly the threaded portion for the actuating nut, against lateral movement, an exceptionally strong and durable tool bit clamping mechanism is attained. With the present structure the flexing action is distributed over a relatively long section of the draw bolt and none whatever is carried by or need be resisted by the threaded portion or by the clamp nut. In consequence, no additional burden is placed upon the screw and nut such as would make clamping and unclamping difficult.

Cooperatively related with the clamping element of this invention is the means for positively maintaining the tool bit square on its seat in the first instance. As illustrated herein such means may take the form of a series of interfitting serrations formed preferably upon the under surface of the bit and on the platform 14, which extend longitudinally of the bit and holder. As the bit is urged rearwardly, it is positively restrained from twisting or shifting laterally on its seat. Additionally, however, the serrations provide a ready means for effecting lateral adjustment of the tool bit in either direction depending upon the nature of the tooling operation and whether a left or a right handed tool is required.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A pressure equalizing clamp for insertable bit tool holders having in combination a supporting body member having a tool bit receiving opening formed therein, said opening being defined by a lower bit supporting platform surface and an overlying surface of the body member in spaced relation therewith; a tool bit resting on said platform; a bit clamping member movable in transverse directions intervening between the top of the bit and the under surface of said overlying portion of the body member; and manually operable means for urging said clamping member into bit clamping relation with the tool bit and holder thereby to clamp the bit on said platform, said means including an attenuated member secured to said clamp member adapted to flex in transverse directions in response to the movement of said clamp member in effecting equalization of the clamping pressures on the bit.

2. A pressure equalizing clamp for insertable bit tool holders combining an elongated supporting body member having a tool bit receiving recess formed across its forward end, said recess being defined by a lower bit-supporting platform surface and an overlying surface of the body member, said surfaces converging toward each other in a rearward direction; a tool bit resting on said platform; a bit clamping member movable in transverse directions intervening between the bit and the under surface of said overlying portion of the body member, said bit and clamping member together being tapered complementally to the said recess; and manually operable means for urging said clamping member in bit clamping relation with the tool bit and holder thereby to clamp the bit on said platform, said means including a relatively long draw bolt member secured to said clamp member and axially movable in a bore formed in the said elongated body member, said bore being substantially larger at its forward end than the diameter of the draw bolt whereby said clamp member and said forward portion of the draw bolt may move in transverse directions in effecting equalization of the clamping pressures on the bit.

3. A tool bit holder and self releasing bit clamp means combining an elongated supporting body member having a tool bit receiving opening formed across its forward end, said opening being defined by a lower bit-supporting platform surface and an overlying surface of the body member; a tool bit resting on said platform; a bit clamping wedge member extending crosswise the holder and intervening between the bit and the under surface of said overlying portion of the body member; manually operable means for urging said clamping wedge rearwardly in bit clamping relation with the tool bit and holder thereby to clamp the bit on said platform, said means including a longitudinally extending draw bolt member secured to said wedge member and operable in a longitudinally extending bore of the body member, said draw bolt member being initially formed with an upwardly bent portion at its forward end, and said bore in the body member having an enlarged forward portion to receive the bent portion of said draw bolt, and nut means coacting with the end of the draw bolt, said wedge member, due to the spring in said draw bolt normally tending to move itself away from the surface of the tool bit as the bit clamp is actuated in a clamp releasing direction.

4. A compensating clamp for insertable bit tool holders combining an elongated supporting body member having a tool bit receiving opening formed across its forward end, said opening being defined by an upper and a lower and a rear bit supporting surfaces; a tool bit resting on said lower surface; a bit clamping wedge member movable in transverse directions intervening between the bit and the said upper surface of said opening; manually operable means for urging said wedge member in bit clamping relation with the tool bit and holder thereby to clamp the bit on said platform, including a longitudinally extending draw bolt secured to said clamp member and enclosed in a longitudinally extending bore in the body member, and screw means cooperating with the end of the bolt and the body member for actuating the clamp, said longitudinal bore being enlarged at its forward end and for a substantial distance rearwardly to afford ample space for movement of the forward portion of the bolt in transverse directions incident to the transverse movements of said clamp member in compensating for irregularities on the bit thereby to insure uniform distribution of the clamping pressure on the bit.

5. A compensating clamp for insertable bit tool holders combining a supporting body member having a tool bit receiving opening formed therein, said opening being defined by an upper and a lower and a rear bit supporting surfaces;

a tool bit resting on said lower surface; a transversely movable bit clamping wedge member intervening between the bit and the said upper surface of said opening; manually operable means for urging said wedge member in bit clamping relation with the tool bit and holder thereby to clamp the bit on said lower surface and against said rear supporting surface including an elongated draw bolt secured to said clamp member and enclosed in a bore provided in the body member, and screw means cooperating with the end of the bolt and the body member for actuating the clamp, said bore being enlarged at the clamp end and for a substantial distance rearwardly therefrom to afford ample space for movement of the forward portion of the bolt in transverse directions incident to the transverse movements of said clamp member in compensating for irregularities on the bit thereby to insure uniform distribution of the clamping pressure on the bit; and interengaging means between the tool bit and said lower surface for positively restraining said bit against twisting or lateral shifting relative to said lower surface.

6. A tool bit holder for detachable tool bits combining an elongated supporting body member having a tool bit receiving opening formed across its forward end, said opening being defined by a lower bit supporting platform surface adapted to support a tool bit and an overlying surface spaced therefrom; a bit clamping member extending crosswise the holder in spaced relation with said platform and engaging the said overlying surface; manual means for actuating said clamping member into bit clamping position, said means including a longitudinally extending and slightly flexible draw bolt member secured to said clamping member and operable in a longitudinally extending bore of the body member, said bore in the body member having its forward portion enlarged to afford freedom in lateral movement of the clamp member in transverse directions in effecting an equalization of the clamping forces exerted thereby.

ERNEST REANEY.